(12) United States Patent
Schneider et al.

(10) Patent No.: US 9,061,380 B2
(45) Date of Patent: Jun. 23, 2015

(54) APPARATUS AND METHOD FOR POSITIONING A FLUID STORAGE TANK

(75) Inventors: William A. Schneider, Conroe, TX (US); Joseph R. Wiegand, Willis, TX (US)

(73) Assignee: CONTAINMENT SOLUTIONS, INC., Conroe, TX (US)

( * ) Notice: Subject to any disclaimer, the term of this patent is extended or adjusted under 35 U.S.C. 154(b) by 538 days.

(21) Appl. No.: 13/447,833

(22) Filed: Apr. 16, 2012

(65) Prior Publication Data

US 2013/0270278 A1    Oct. 17, 2013

(51) Int. Cl.

| | |
|---|---|
| *B65D 88/76* | (2006.01) |
| *B65D 45/00* | (2006.01) |
| *B23P 17/04* | (2006.01) |
| *B65D 90/48* | (2006.01) |

(52) U.S. Cl.

CPC .............. *B23P 17/04* (2013.01); *Y10T 29/49771* (2015.01); *B65D 90/48* (2013.01); *B65D 88/76* (2013.01)

(58) Field of Classification Search

CPC ................................ B65D 88/76; B65D 90/48
USPC .............. 220/676, 669, 567.1, 315, 320, 694; 29/407.05, 407.09
See application file for complete search history.

(56) References Cited

U.S. PATENT DOCUMENTS

| | | | | |
|---|---|---|---|---|
| 2,006,669 | A * | 7/1935 | Clay | 280/838 |
| 2,124,441 | A * | 7/1938 | Thwaits | 220/686 |
| 3,614,891 | A * | 10/1971 | Nolte | 73/152.15 |
| 4,110,947 | A * | 9/1978 | Murray et al. | 52/249 |
| 4,955,573 | A * | 9/1990 | Horvath | 248/313 |
| 5,131,133 | A * | 7/1992 | Peterson et al. | 52/741.3 |
| 5,956,077 | A * | 9/1999 | Qureshi et al. | 348/82 |
| 5,973,770 | A * | 10/1999 | Carter et al. | 356/4.09 |
| 6,345,933 | B1 * | 2/2002 | Harding et al. | 405/53 |
| 6,685,392 | B1 * | 2/2004 | Wokas | 405/52 |
| 7,000,800 | B2 * | 2/2006 | Boudry | 220/567.2 |
| 8,555,697 | B2 * | 10/2013 | Kaya | 73/1.73 |
| 2004/0020933 | A1 * | 2/2004 | Boudry | 220/567.2 |
| 2010/0212397 | A1 * | 8/2010 | Kaya | 73/1.73 |

* cited by examiner

*Primary Examiner* — Lisa Caputo
*Assistant Examiner* — Jonathan Dunlap
(74) *Attorney, Agent, or Firm* — Cantor Colburn LLP

(57) ABSTRACT

In one aspect, a method for positioning a fluid storage tank in an underground installation site includes providing the fluid storage tank that includes a measuring device configured to provide a deflection measurement for the fluid storage tank and placing the fluid storage tank in the underground installation site. The method also includes measuring a first value for the deflection measurement from a distance from the measuring device after placing the fluid storage tank in the underground installation site without an operator being positioned on the fluid storage tank, wherein the first value provides a baseline for determining deflection of the fluid storage tank.

29 Claims, 4 Drawing Sheets

APPARATUS AND METHOD FOR POSITIONING A FLUID STORAGE TANK

BACKGROUND OF THE DISCLOSURE

1. Field of the Disclosure

The disclosure relates generally to apparatus and methods for installation and positioning of fluid storage tanks.

2. Description of the Related Art

Fluid storage tanks may be used at various sites for various purposes. For example, fluid storage tanks made from a durable non-corrosive material, such as fiberglass reinforced plastic, may be used to store petroleum at an underground location. Fluid storage tanks may also be used for storage of fuels, lubrication oils, water, wastewater, septic, and alternative biofuels such as ethanol and biodiesel above or below ground.

In some cases, fluid storage tanks can be large, with diameters as large as 10 to 15 feet and lengths of up to 100 feet or longer. The size of these fluid storage tanks can present challenges during installation at an installation site. For example, after placement at an installation site, an installer or operator will have to take certain measurements to ensure proper installation, where the operator is positioned on top of the tank to take the measurements. In some situations, having an operator positioned on top of the tank may add complexity to the installation process as certain safety precautions and procedures must be followed to prevent accidents.

SUMMARY

In one aspect, a fluid storage tank apparatus to be installed in an underground installation site includes a fluid storage tank and a measuring device configured to provide a deflection measurement for the fluid storage tank at a distance from the measuring device after placing the fluid storage tank in the underground installation site, the deflection measurement being provided without an operator being positioned on the fluid storage tank.

In another aspect, a method for positioning a fluid storage tank in an underground installation site includes providing the fluid storage tank that includes a measuring device configured to provide a deflection measurement for the fluid storage tank and placing the fluid storage tank in the underground installation site. The method also includes measuring a first value for the deflection measurement at a distance from the measuring device after placing the fluid storage tank in the underground installation site without an operator being positioned on the fluid storage tank, wherein the first value provides a baseline for determining deflection of the fluid storage tank as well as values that measure deflection during various stages on the installation.

BRIEF DESCRIPTION OF THE DRAWINGS

The disclosure herein is best understood with reference to the accompanying figures in which like numerals have generally been assigned to like elements and in which.

DETAILED DESCRIPTION

Figure 1:
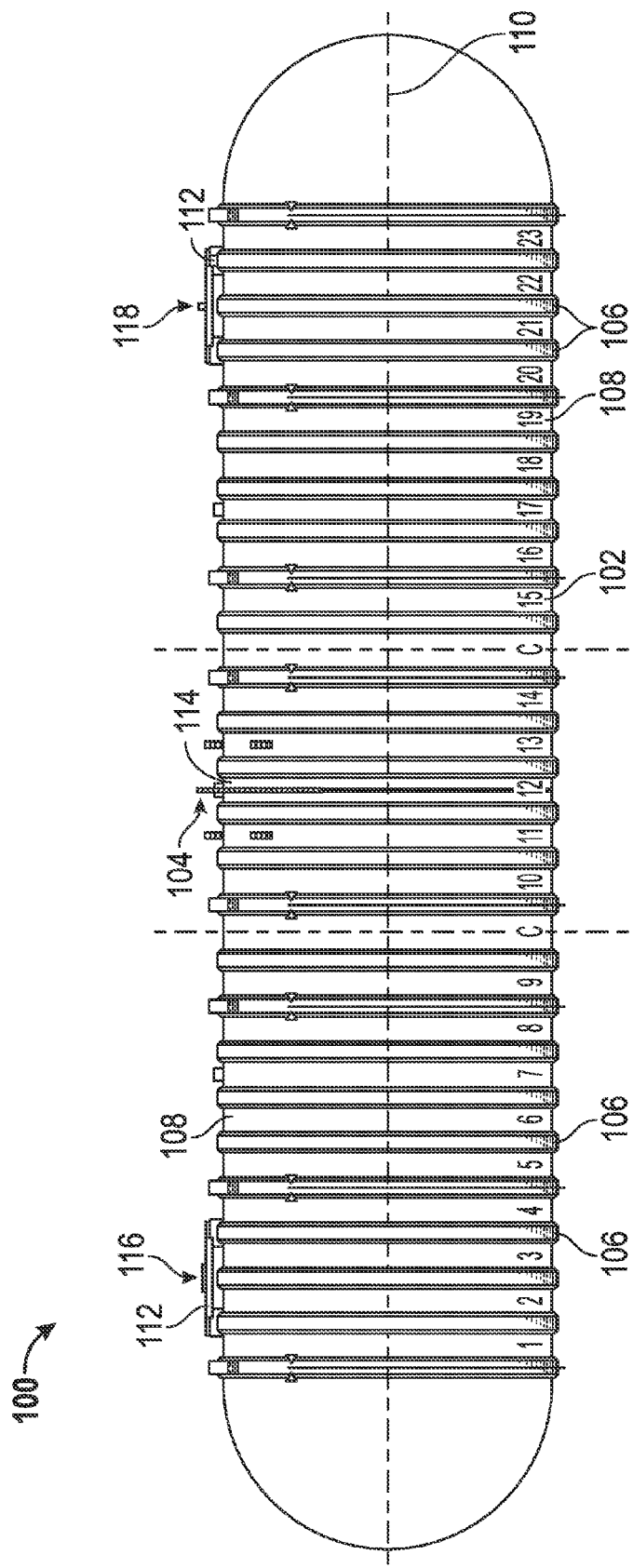
FIG. 1 is a side view of an exemplary fluid storage apparatus.

FIG. 1 is a side view of an exemplary fluid storage apparatus 100. The fluid storage apparatus 100 includes a fluid storage tank 102, a first measuring device 104, a second measuring device 116 and a third measuring device 118. In an aspect, the fluid storage tank 102 also includes a plurality of ribs 106 on an outer surface 108 of the fluid storage tank 102. In an embodiment, the ribs 106 are circumferential ribs that extend radially from the surface 108, where the ribs 106 are substantially perpendicular to a longitudinal axis 110 of the fluid storage tank 102. In one aspect, the ribs 106 provide structural support and reinforcement for the fluid storage tank 102, where the tank is subjected to internal and external stresses during use. The fluid storage tank 102 also includes manway covers 112 which provide access to the inner portion of the fluid storage tank 102.

In an aspect, the first measuring device 104 is positioned in an opening of a wall 114 of the fluid storage tank 102. The second measuring device 116 and third measuring device 118 are positioned in suitable locations, such as manway covers 112, on the fluid storage tank 102 for level measurements. The first measuring device 104 is configured to provide measurements to determine deflection of the fluid storage tank 102 during installation. As described in detail below, the first measuring device 104 may include a graduated member or electronic device to perform a measurement of a distance within the fluid storage tank 102. Internal distance measurements are performed at various points in the installation process, where changes in measurement values determine a deflection for the fluid storage tank 102. Further, in an aspect, a deflection beyond a certain value is undesirable and may lead to excessive stress on the tank.

The second and third measuring devices 116, 118 are configured to provide tank level measurements as the fluid storage tank 102 is positioned in an underground installation site. The measuring devices 116, 118 provide level measurements without an operator being positioned on top of the fluid storage tank 102. As depicted, the second measuring device 116 provides a level measurement in a longitudinal direction (with respect to longitudinal axis 110) and the third measuring device 118 provides a level measurement in a second direction substantially perpendicular to the longitudinal direction. In embodiments, the fluid storage tank 102 has any suitable shape, such as the depicted substantially cylindrical shape. Further, the fluid storage tank 102 may be made from any suitable non-corrosive durable material, such as fiberglass reinforced plastic.

Figure 2:
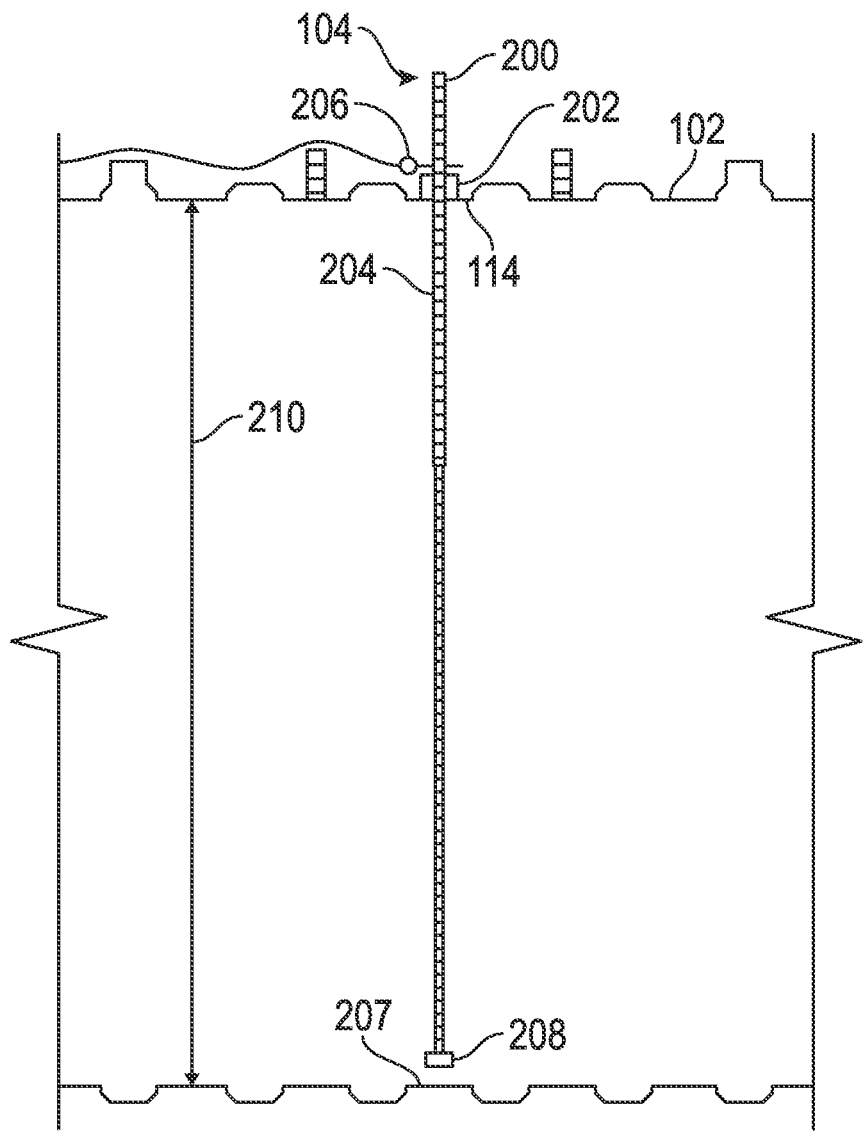
FIG. 2 is a detailed view of a section of the fluid storage apparatus shown in FIG. 1.

FIG. 2 is a detailed view of a section of the fluid storage apparatus 100 shown in FIG. 1. The fluid storage apparatus 100 includes the first measuring device 104 positioned in an opening in the wall 114. In an embodiment, the first measuring device 104 includes a graduated member 200 placed in a fitting 202 in the wall 114. In an aspect, the graduated member 200 travels through a guide member 204 that causes movement in a direction substantially perpendicular to the wall 114 and axis 110. A portion of the graduated member 200 protrudes from the tank wall 114, thereby providing a visual indication or measurement for a distance 210. The first measuring device 104 further includes a latching mechanism 206 to prevent one end of the graduated member 200 from contacting an inner surface 207 of the tank wall 114 when latched. In embodiments, the latching mechanism 206 is latched to suspend the graduated member 200 during transport of the fluid storage apparatus 100 to prevent damage to the inner surface 207 or the graduated member 200. In one embodiment, the latch mechanism 206 comprises a pin coupled to a leash, where the leash and pin are pulled to unlatch the graduated member 200 after delivery and prior to a first measurement taken by the first measuring device 104. In addition, a protective member 208 may be positioned on one end of the graduated member 200 to protect the graduated member 200 and inner surface 207 during transport. In embodiments, the graduated member 200 of the measuring device 104 provides a visual indication of a deflection measurement readable from a distance from the fluid storage tank. For example, the graduated member 200 may be read by an operator positioned outside an underground installation site via a magnifying instrument, such as binoculars, thereby providing the ability to measure the distance 210 without the operator positioned on top of the fluid storage tank 102.

The deflection measurements enable proper installation of the fluid storage apparatus 100 to improve tank durability, increase tank lifespan and improve tank operation. In an embodiment, the first measuring device 104 is placed in the fluid storage tank 102 at an assembly site (factory) prior to shipment. In another embodiment, the first measuring device 104 is placed on the fluid storage tank 102 after transport to the installation location but prior to placing the tank in the underground installation site (e.g., by rolling the tank to one side to access a top portion of the tank).

Figure 3:
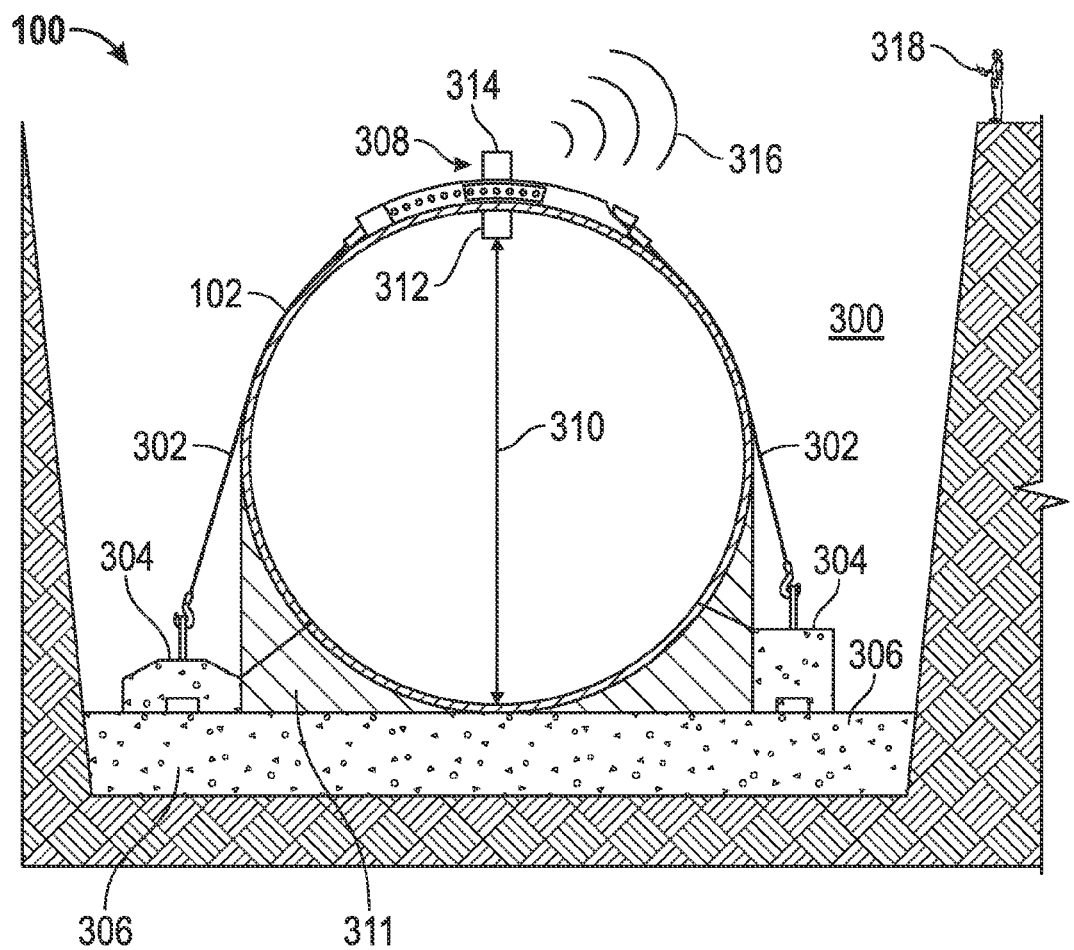
FIG. 3 is side sectional view of the fluid storage apparatus from FIGS. 1 and 2 placed in an underground installation site.

FIG. 3 is a side sectional view of the fluid storage apparatus 100 placed in an underground installation site 300. The fluid storage tank 102 is secured via anchor straps 302 to anchors 304. The anchors 304 are coupled to, embedded in or otherwise attached to a ground surface 306 of the underground installation site 300. In an embodiment, a measuring device 308 is configured to measure a distance 310 of at least a portion of the diameter of the fluid storage tank 102. In an aspect, the measuring device 308 takes the measurement at various points or stages of the installation process to determine a deflection of the fluid storage tank 102. For example, a first measurement is taken after the fluid storage tank 102 is placed in the underground installation site 300. A second measurement is then taken after the anchor straps 302 are secured to the anchors 304 and tightened about the fluid storage tank 102. In the example, the first measurement is used as a "baseline" measurement, where subsequent measurements including the second measurement are compared to the baseline measurement to determine the tank deflection. Accordingly, the difference in values from the first (baseline) and second (subsequent) measurements provides an indication of deflection for the fluid storage tank 102. In addition, a third measurement may be taken after backfill 311 is placed in the underground installation site 300 and about at least a portion of the fluid storage tank 102. The measuring device 308 provides a deflection measurement (e.g., distance 310) without an operator positioned on top of the fluid storage tank 102. In an embodiment, the measuring device 308 includes a sensor 312 and a transmitter 314 that communicates the measurement, via a signal 316, to an operator 318 at a distance from the fluid storage tank 102. The operator 318 may have a receiver and display device that receives the signal 316 wirelessly via a suitable protocol, such as RF, Bluetooth or infrared signals.

Figure 4:
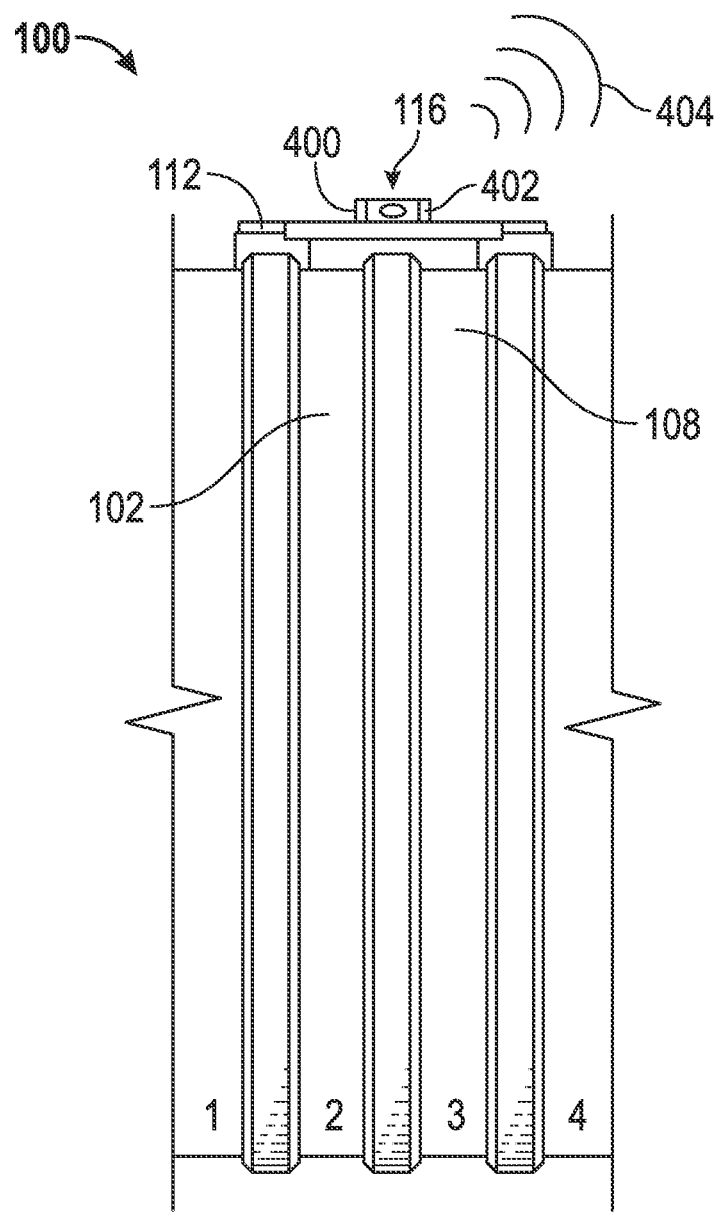
FIG. 4 is a detailed side view of a portion of the fluid storage apparatus shown in FIG. 1.

FIG. 4 is a detailed side view of a portion of the fluid storage apparatus 100 shown in FIG. 1. The fluid storage apparatus 100 includes the second measuring device 116 placed on the manway cover 112. As depicted, the second measuring device 116 is configured to provide level measurements for the fluid storage tank 102 in a first direction and a second direction, where the first direction is substantially along the longitudinal axis 110 (e.g., longitudinal level measurement) and the second direction is substantially perpendicular to the axis (e.g., rotational or lateral level measurement). In an embodiment, the third measuring device 118 is also configured to provide a level measurement for the first and/or second directions. Accordingly, the present description directed to the second measuring device 116 also applies to the third measuring device 118. The provided level measurements enable proper positioning of the fluid storage apparatus 100 at an installation site thus improving operation and distribution of fluid in the tank.

In embodiments, the second measuring device 116 may be placed at any location on the fluid storage tank 102 to provide level measurements in one or more directions. The second measuring device 116 includes a sensor 400 and a transmitter 402 configured to provide a wireless signal 404 to an operator at a distance. In an aspect, the second measuring device 116 provides the level measurement without an operator positioned on the storage tank to simplify the fluid storage apparatus 100 installation process. In an embodiment, the sensor 400 includes a visual indicator of the level measurement (e.g., a level bubble) that may be monitored from a distance, such as outside an underground installation site, via a magnifying apparatus. Further, the sensor 400 may include an electronic sensor device configured to provide level measurements that are transmitted via the transmitter 402 and signal 404 to a remotely located operator (i.e., positioned off the fluid storage tank 102). In an embodiment, the second measuring device 116 is placed on the fluid storage tank 102 at an assembly site (e.g., factory) prior to shipment. In another embodiment, the second measuring device 116 is placed on the fluid storage tank 102 after assembly and transport to the installation location but prior to placing the fluid storage tank in the underground installation site (e.g., by rolling the tank to one side to access the manway cover 112). The second measuring device 116 may be coupled to the tank via any suitable temporary or permanent mechanism, such as welding, brazing, adhesive or magnets.

While the foregoing disclosure is directed to certain embodiments, various changes and modifications to such embodiments will be apparent to those skilled in the art. It is intended that all changes and modifications that are within the scope and spirit of the appended claims be embraced by the disclosure herein.

The invention claimed is:

1. A method for positioning a fluid storage tank in an underground installation site, the method comprising:
   providing the fluid storage tank that includes a measuring device configured to provide a deflection measurement for the fluid storage tank;
   placing the fluid storage tank in the underground installation site;
   measuring a first value for the deflection measurement from a distance from the measuring device after placing the fluid storage tank in the underground installation site without an operator being positioned on the fluid storage tank, wherein the first value provides a baseline for determining deflection of the fluid storage tank;
   securing anchor straps to an anchor in the underground installation site to secure the fluid storage tank;
   tightening the anchor straps to the anchor in the underground installation site; and
   measuring a second value for the deflection measurement of the fluid storage tank from a distance from the measuring device after the anchor straps are tightened without an operator being positioned on the fluid storage tank.

2. The method of claim 1, further comprising placing backfill in the underground installation site about the fluid storage tank and measuring a second value for the deflection measurement of the fluid storage tank from a distance from the measuring device.

3. The method of claim 1, wherein measuring the first value for the deflection measurement comprises providing a baseline internal tank measurement used to provide the deflection measurement for the fluid storage tank.

4. The method of claim 1, wherein providing the fluid storage tank comprises providing the fluid storage tank that includes the measuring device configured to allow the operator to measure the diameter of the fluid storage tank from outside the underground installation site.

5. The method of claim 1, wherein providing the fluid storage tank comprises providing the fluid storage tank that includes the measuring device with a latch mechanism configured to suspend a graduated member of the measuring device during transport to prevent contact of an end of the graduated member with an inner surface of a tank wall and further comprises removing the latch mechanism from the measuring device after the fluid storage tank is placed in the underground installation site prior to taking the first measurement.

6. The method of claim 1, wherein providing the fluid storage tank comprises placing the measuring device on the fluid storage tank at one of an assembly site prior to transport of the fluid storage tank to an installation location or at the installation location prior to placement in the underground installation site.

7. A method for positioning a fluid storage tank in an underground installation site, the method comprising:
providing the fluid storage tank that includes a measuring device configured to provide a measurement of a tank level in a longitudinal direction and a lateral direction, wherein the longitudinal direction is substantially perpendicular to the lateral direction;
placing the fluid storage tank in the underground installation site; and
measuring the tank level in the longitudinal and lateral directions for the fluid storage tank from a distance from the measuring device after placing the fluid storage tank in the underground installation site without an operator being positioned on the fluid storage tank.

8. The method of claim 7, wherein providing the fluid storage tank comprises providing the fluid storage tank that includes the measuring device configured to allow the operator to measure the tank level in the longitudinal and lateral directions from outside the underground installation site.

9. The method of claim 7, comprising placing the measuring device on the fluid storage tank prior to placing the fluid storage tank in the underground installation site.

10. The method of claim 7, where the measuring device is placed on the fluid storage tank at one of an assembly site prior to transport of the fluid storage tank to an installation location or at the installation location prior to placement in the underground installation site.

11. The method of claim 7, wherein providing the fluid storage tank comprises providing the fluid storage tank that includes the measuring device comprising an electronic level measurement sensor and a transmitter to enable remote display of a measurement.

12. A fluid storage tank apparatus to be installed in an underground installation site, the apparatus comprising:
a fluid storage tank;
a measuring device configured to provide a deflection measurement for the fluid storage tank from a distance from the measuring device after placing the fluid storage tank in the underground installation site, the deflection measurement being provided without an operator being positioned on the fluid storage tank; and
anchor straps configured to secure the fluid storage tank to an anchor in the underground installation site, wherein a first value for the deflection measurement before the anchor straps are secured to the anchor and a second value for the deflection measurement after the anchor straps are secured to the anchor are used to provide the deflection measurement for the fluid storage tank.

13. The apparatus of claim 12, wherein the measuring device is configured to allow the operator to measure the diameter of the fluid storage tank from outside the underground installation site.

14. The apparatus of claim 12, wherein the measuring device comprises a latch mechanism configured to suspend a graduated member of the measuring device during transport, where the graduated member is suspended during transport to prevent contact of an end of the graduated member with an inner surface of a tank wall, wherein the latch mechanism is removed from the measuring device after the fluid storage tank is placed in the underground installation site.

15. A method for positioning a fluid storage tank in an underground installation site, the method comprising:
providing the fluid storage tank that includes a measuring device configured to provide a deflection measurement for the fluid storage tank, wherein providing the fluid storage tank comprises providing the fluid storage tank that includes the measuring device comprising a graduated member protruding through an opening in a tank wall and a protective member configured to protect an inner surface of the tank wall proximate an end of the graduated member during transport;
placing the fluid storage tank in the underground installation site; and
measuring a first value for the deflection measurement from a distance from the measuring device after placing the fluid storage tank in the underground installation site without an operator being positioned on the fluid storage tank, wherein the first value provides a baseline for determining deflection of the fluid storage tank.

16. The method of claim 15, further comprising placing backfill in the underground installation site about the fluid storage tank and measuring a second value for the deflection measurement of the fluid storage tank from a distance from the measuring device.

17. The method of claim 15, wherein measuring the first value for the deflection measurement comprises providing a baseline internal tank measurement used to provide the deflection measurement for the fluid storage tank.

18. The method of claim 15, wherein providing the fluid storage tank comprises providing the fluid storage tank that includes the measuring device configured to allow the operator to measure the diameter of the fluid storage tank from outside the underground installation site.

19. The method of claim 15, wherein providing the fluid storage tank comprises providing the fluid storage tank that includes the measuring device with a latch mechanism configured to suspend the graduated member of the measuring device during transport to prevent contact of an end of the graduated member with an inner surface of a tank wall and further comprises removing the latch mechanism from the measuring device after the fluid storage tank is placed in the underground installation site prior to taking the first measurement.

20. The method of claim 15, wherein providing the fluid storage tank comprises placing the measuring device on the fluid storage tank at one of an assembly site prior to transport of the fluid storage tank to an installation location or at the installation location prior to placement in the underground installation site.

21. A method for positioning a fluid storage tank in an underground installation site, the method comprising:
providing the fluid storage tank that includes a measuring device configured to provide a deflection measurement for the fluid storage tank, wherein providing the fluid storage tank comprises providing the fluid storage tank that includes the measuring device comprising an electronic level measurement sensor and a transmitter to enable remote display of a measurement;
placing the fluid storage tank in the underground installation site; and
measuring a first value for the deflection measurement from a distance from the measuring device after placing the fluid storage tank in the underground installation site without an operator being positioned on the fluid storage tank, wherein the first value provides a baseline for determining deflection of the fluid storage tank.

22. The method of claim 21, further comprising placing backfill in the underground installation site about the fluid storage tank and measuring a second value for the deflection measurement of the fluid storage tank from a distance from the measuring device.

23. The method of claim 21, wherein measuring the first value for the deflection measurement comprises providing a baseline internal tank measurement used to provide the deflection measurement for the fluid storage tank.

24. The method of claim 21, wherein providing the fluid storage tank comprises providing the fluid storage tank that includes the measuring device configured to allow the operator to measure the diameter of the fluid storage tank from outside the underground installation site.

25. The method of claim 21, wherein providing the fluid storage tank comprises placing the measuring device on the fluid storage tank at one of an assembly site prior to transport of the fluid storage tank to an installation location or at the installation location prior to placement in the underground installation site.

26. A fluid storage tank apparatus to be installed in an underground installation site, the apparatus comprising:
a fluid storage tank; and
a measuring device configured to provide a deflection measurement for the fluid storage tank from a distance from the measuring device after placing the fluid storage tank in the underground installation site, the deflection measurement being provided without an operator being positioned on the fluid storage tank, wherein the measuring device comprises a graduated member protruding through a fitting in a tank wall.

27. The apparatus of claim 26, wherein the measuring device is configured to allow the operator to measure the diameter of the fluid storage tank from outside the underground installation site.

28. The apparatus of claim 26, wherein the measuring device comprises a protective member configured to protect an inner surface of the tank wall proximate an end of the graduated member during transport.

29. The apparatus of claim 26, wherein the measuring device comprises a latch mechanism configured to suspend the graduated member of the measuring device during transport, where the graduated member is suspended during transport to prevent contact of an end of the graduated member with an inner surface of a tank wall, wherein the latch mechanism is removed from the measuring device after the fluid storage tank is placed in the underground installation site.

* * * * *